United States Patent
Yan

(10) Patent No.: US 12,465,018 B1
(45) Date of Patent: Nov. 11, 2025

(54) SELF-CIRCULATING PET SHOWER MACHINE

(71) Applicant: Yubo Dong, Ontario, CA (US)

(72) Inventor: Yongming Yan, Shanghai (CN)

( * ) Notice: Subject to any disclaimer, the term of this patent is extended or adjusted under 35 U.S.C. 154(b) by 81 days.

(21) Appl. No.: 18/662,791

(22) Filed: May 13, 2024

(51) Int. Cl.
*A01K 13/00* (2006.01)

(52) U.S. Cl.
CPC .................................. *A01K 13/001* (2013.01)

(58) Field of Classification Search
None
See application file for complete search history.

(56) References Cited

U.S. PATENT DOCUMENTS

| | | | | |
|---|---|---|---|---|
| 6,651,588 | B1* | 11/2003 | Penzimer | A01K 13/001 119/665 |
| 2003/0091440 | A1* | 5/2003 | Patel | F04B 39/121 417/40 |
| 2007/0245484 | A1* | 10/2007 | Robles | A47K 3/074 4/572.1 |
| 2008/0083440 | A1* | 4/2008 | Miyazaki | A61P 17/00 134/133 |
| 2017/0173482 | A1* | 6/2017 | Weisman | A63H 23/10 |
| 2018/0223863 | A1* | 8/2018 | Weber | F04D 29/426 |
| 2023/0320322 | A1* | 10/2023 | La Penna | A47L 7/0019 119/622 |

* cited by examiner

*Primary Examiner* — Katelyn W Smith
(74) *Attorney, Agent, or Firm* — Tommy SF Wang; Wang IP Law Group, P.C.

(57) ABSTRACT

The self-circulating pet shower machine comprises a top case with protrusions inside, a bottom case connected to the top case by bolts, and a motor. The middle portion of the motor has stops abutting the protrusions, with a first sealing ring between the top face of the bottom case and the stops. A shock-absorbing gasket sits between the stops and the protrusions. A booster plate beneath the motor and outlet port features inlet holes with helical guide grooves. An impeller includes an inlet port surrounded by a circular baffle. A water guide bottom plate has an inner periphery surrounded by an outer periphery. The inner periphery is embedded in the circular baffle of the impeller, and the outer periphery is secured to the side wall of the bottom case by the bolts.

10 Claims, 4 Drawing Sheets

SELF-CIRCULATING PET SHOWER MACHINE

FIELD OF THE INVENTION

The present invention generally relates to a pet care appliance and, more particularly, to a pet shower machine.

BACKGROUND OF THE INVENTION

With the development of the pet industry, the demand for pet care has been increasing. The pet care process usually involves placing the pet in a container such as a bathtub, applying shampoo mixed with water to the pet, manually scrubbing the pet's fur repeatedly, and finally rinsing the pet with clean water using a shower head until the fur is clean, after which the water in the bathtub is drained through a drainage pipe.

However, this process may be repeated multiple times, requiring long periods of manual scrubbing by pet care caregivers, increasing the labor intensity of pet care operations. In addition, manual scrubbing may require many repetitions to thoroughly clean the pet's fur, which reduces the efficiency of grooming and, in particular, causes significant waste of water resources, increasing grooming costs.

SUMMARY OF THE INVENTION

In order to overcome the disadvantages associated with the aforementioned pet care appliances, a self-circulating pet shower machine is disclosed. The self-circulating pet shower machine can quickly and conveniently clean pets, allows the mixed shampoo and clean water to be recycled, greatly reduces waste of water resources, reduces the cost of pet care, reduces the labor intensity of care operations, and improves the efficiency of care.

The self-circulating pet shower machine includes a top case, a bottom case, a motor, a shock-absorbing gasket, a booster plate, an impeller, a water guide bottom plate, a filter cover, and a showerhead. The top case has protrusions. The protrusions are arranged at intervals in an inner cavity of and along a longitudinal direction of the top case. The bottom case is connected with the top case by bolts. The bottom case has a top face, a side wall, a first sealing ring, and an outlet port. The side wall is connected to the top face. The outlet port is located on the side wall. The motor has an upper portion, a lower portion, a middle portion, and a stop. The upper portion is located in the inner cavity of the top case. The middle portion is located between the upper portion and the lower portion. The stop is arranged along a periphery of the middle portion. The stop can abut against a bottom end of the protrusions. The bottom case can enclose the lower portion and abut against the stop. The first sealing ring is located between the top face of the bottom case and the stop. The shock-absorbing gasket is located between the stop and the bottom end of the protrusions. The booster plate is located in an inner cavity of the bottom case and under both the outlet port and the motor. The booster includes a plurality of inlet holes. The inlet holes are arranged on a periphery of the booster plate. Each of the inlet holes has a helical guide groove. The helical guide grooves are arranged on a surface facing the motor. The impeller is connected to a shaft of the motor, and the shaft passes through the booster plate. The impeller includes a circular baffle, an inlet port, and an air passage. The circular baffle is located at a central portion of the impeller. The inlet port is surrounded by the circular baffle, and the inlet port is connected with the air passage.

The water guide bottom plate has an inner periphery and an outer periphery. The inner periphery is surrounded by the outer periphery. The inner periphery is embedded in the circular baffle of the impeller. The outer periphery is secured to the side wall of the bottom case by the bolts. The filter cover is located on a bottom face of the bottom case. The showerhead is connected to the outlet port by a hose.

The self-circulating pet shower machine may be configured such that the top case further includes a receiving groove and a wire clamp. The receiving groove is located at an end face of the inner cavity. The receiving groove surrounds a wire hole. The wire clamp is located and secured in the receiving groove by a securing plate near the end face of the top case. This allows a wire to pass through the wire hole and the wire clamp for connection to the motor.

The self-circulating pet shower machine may be configured such that the wire clamp includes a rubber washer and three locking claws. The three locking claws are spaced on a surface of the rubber washer. The three locking claws are inclined towards a center of the rubber washer. The securing plate has a through hole. The diameter of the through hole is larger than the outer diameter of the wire and smaller than the inner diameter formed by the three locking claws.

The self-circulating pet shower machine may be configured such that the top case further includes a carrying handle. The carrying handle is disposed on an outer surface of the top case.

The self-circulating pet shower machine may be configured such that the impeller includes thin walls spaced at intervals and spiral air passages disposed between the thin walls.

The self-circulating pet shower machine may be configured such that the motor further includes an anti-backflow sealing gasket between the shaft of the motor and the bottom case.

The self-circulating pet shower machine may be configured such that the water guide bottom plate includes a second sealing ring. The second sealing ring is between the outer periphery of the water guide bottom plate and the side wall of the bottom case. The bottom surface of the water guide bottom plate has radial ribs spaced at intervals, with water guide grooves formed between the radial ribs.

The self-circulating pet shower machine may be configured such that the filter cover includes a third sealing ring. The third sealing ring is located on a top face of the filter cover and faces the water guide bottom plate.

The self-circulating pet shower machine may be configured such that the showerhead includes a water pressure regulator. The hose is connected to the showerhead and the outlet port by quick couplers at both ends.

The self-circulating pet shower machine may be configured such that the showerhead further includes a rubber comb-shaped massage head. The rubber comb-shaped massage head is located at an end face of the showerhead.

BRIEF DESCRIPTION OF THE DRAWINGS

The drawings illustrate examples. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE PREFERRED EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
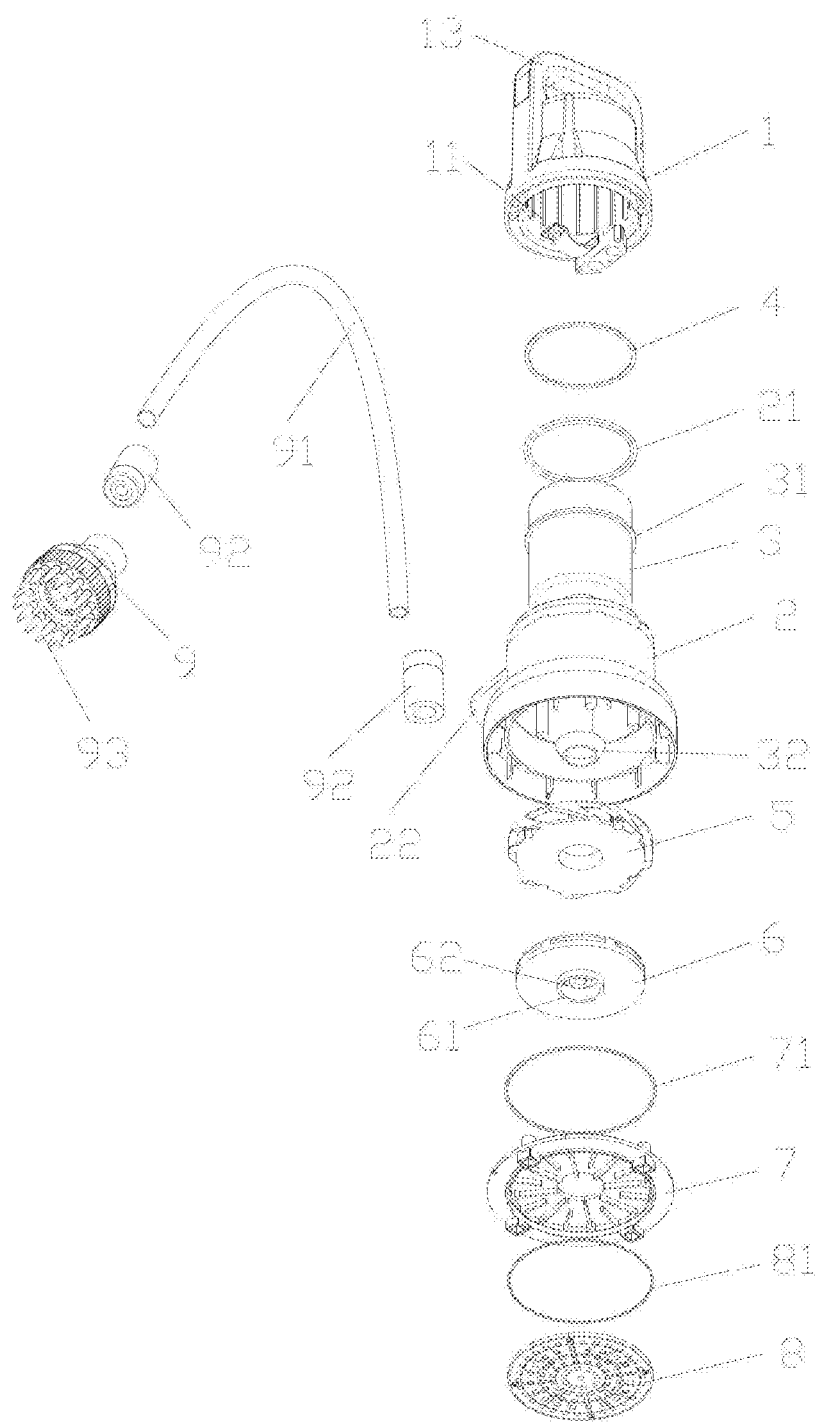
FIG. 1 shows an exploded perspective view of an embodiment of a self-circulating pet shower machine.
Figure 2:
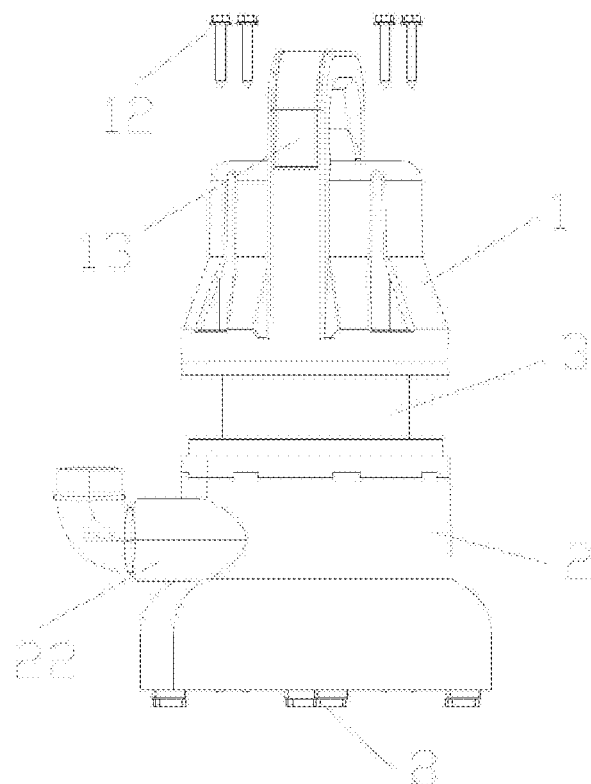
FIG. 2 shows a perspective view of the assembly of the top case and bottom case of the embodiment.
Figure 3:
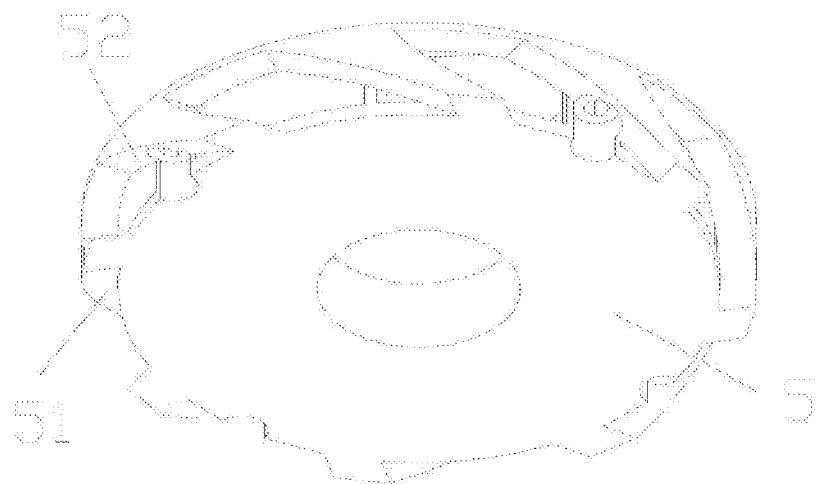
FIG. 3 shows a perspective view of the booster plate of the embodiment.

FIG. 1 shows an exploded perspective view of an embodiment of a self-circulating pet shower machine. FIG. 2 shows a perspective view of the assembly of the top case and bottom case of the embodiment. FIG. 3 shows a perspective view of the booster plate of the embodiment.

Referring to FIGS. 1 to 3 together, in the embodiment, the self-circulating pet shower machine includes a top case 1, a bottom case 2, a motor 3, a shock-absorbing gasket 4, a booster plate 5, an impeller 6, a water guide bottom plate 7, a filter cover 8, and a showerhead 9. The top case 1 has a plurality of protrusions 11. The protrusions 11 are arranged at intervals in the inner cavity of the top case 1 and along a longitudinal direction of the top case 1. The bottom case 2 is connected with the top case 1 by bolts 12. The bottom case 2 has a first sealing ring 21 and an outlet port 22. The outlet port 22 is located on the side wall of the bottom case 2. The motor 3 has an upper portion, a lower portion, a middle portion, and a stop 31. The upper portion is located in the inner cavity of the top case 1. The middle portion is between the upper portion and the lower portion. The stop 31 is arranged along a periphery of the middle portion. The stop 31 can abut against a bottom end of the protrusions 11. The bottom case 2 can enclose the lower portion and abut against the stop 31. The first sealing ring 21 is located between the top face of the bottom case 2 and the stop 31, while the top face is connected to the side wall of the bottom case 2. The shock-absorbing gasket 4 is located between the stop 31 and the bottom end of the protrusions 11. The booster plate 5 is located in an inner cavity of the bottom case 2 and under both the outlet port 22 and the motor 3. The booster 5 includes a plurality of inlet holes 51. The inlet holes 51 are arranged on the periphery of the booster plate 5. Each of the inlet holes 51 has a helical guide groove 52. The helical guide grooves 52 are arranged on the surface facing the motor 3. The impeller 6 is connected to the shaft of the motor 3, while the shaft passes through the booster plate 5. The impeller 6 includes a circular baffle 61, an inlet port 62, and an air passage 64. The circular baffle 61 is located at the central portion of the impeller 6. The inlet port 62 is surrounded by the circular baffle 61 and connected with the air passage 64. The water guide bottom plate 7 has an inner periphery and an outer periphery. The inner periphery is surrounded by the outer periphery of the water guide bottom plate 7. The inner periphery is embedded in the circular baffle 61 of the impeller 6. The outer periphery is secured to the side wall of the bottom case 2 by the bolts 12. The filter cover 8 is located on the bottom face of the bottom case 2. The showerhead 9 is connected to the outlet port 22 by a hose 91.

Figure 4:
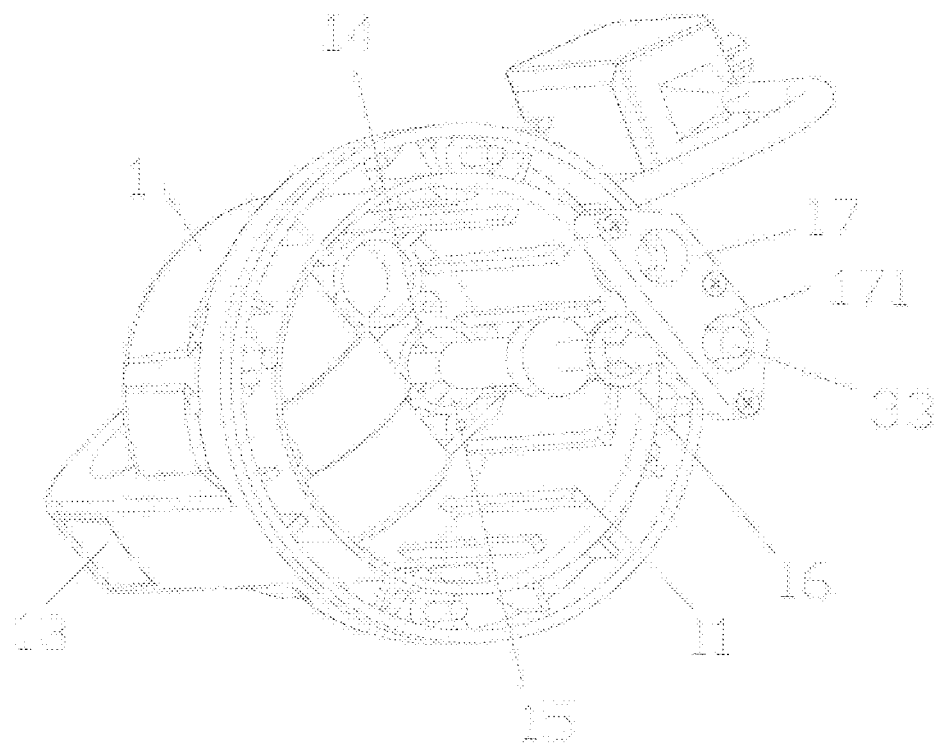
FIG. 4 shows a perspective view of the wire arranged on the top case in another embodiment.
Figure 5:
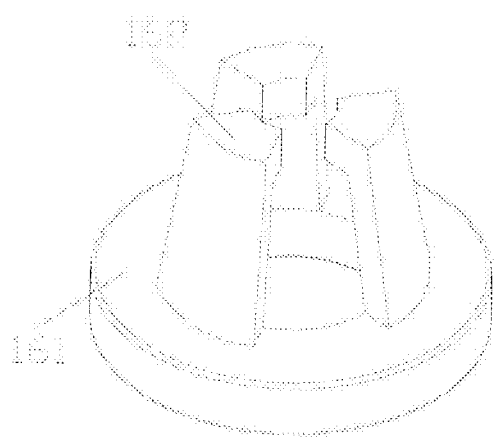
FIG. 5 shows a perspective view of the wire clamp in the embodiment.

FIG. 4 shows a perspective view of the wire arranged on the top case in another embodiment. FIG. 5 shows a perspective view of the wire clamp in the embodiment.

In another embodiment, as shown in FIGS. 4 and 5, the top case 1 further includes a wire hole 14, a receiving groove 15, and a wire clamp 16. The receiving groove 15 is located at an end face of the inner cavity. The receiving groove 15 surrounds a wire hole 14. The wire clamp 16 is located and secured in the receiving groove 15 by a securing plate 17 near the end face of the top case 1. This allows a wire 33 to pass through the wire hole 14 and the wire clamp 16 for connection to the motor 3. The wire 33 of the motor 3 passes through the wire clamp 16 and is tightened in the receiving groove 15 by the securing plate 17, avoiding wire faults caused by shaking during the use of the self-circulating pet shower machine, ensuring the safe and reliable operation of the machine.

Preferably, the wire clamp 16 includes a rubber washer 161 and three locking claws 162. The three locking claws 162 are spaced on a surface of the rubber washer 161. The three locking claws 162 are inclined towards the center of the rubber washer 161. The securing plate 17 has a through hole 171. The diameter of the through hole 171 is larger than the outer diameter of the wire 33 and smaller than the inner diameter formed by the three locking claws 162. The three locking claws 162 of the wire clamp 16 grip the wire 33, preventing it from being pulled loose. Additionally, due to the inclined arrangement of the three locking claws 162 toward the center, when the wire 33 is subjected to a pulling force, the gripping force of the three locking claws 162 on the wire is increased, thereby eliminating the common problem of conventional wires breaking easily.

Referring to FIG. 2, the top case 1 further includes a carrying handle 13. The carrying handle 13 is located on an outer surface of the top case 1. This facilitates the overall operation and portability of the pet shower machine.

Figure 6:
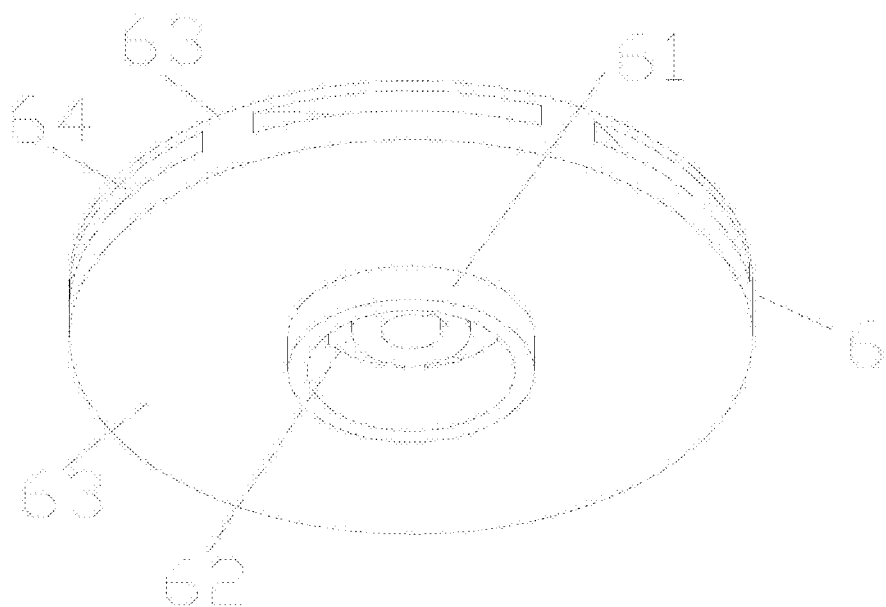
FIG. 6 shows a perspective view of the impeller in the embodiment.

Preferably, as shown in FIG. 6, the impeller 6 includes thin walls 63 and spiral air passages 64. The thin walls 63 are spaced at intervals, and the spiral air passages 64 are arranged between the thin walls 63.

Preferably, the motor 3 further includes an anti-backflow sealing gasket 32 between the shaft of the motor 3 and the bottom case 2. The anti-backflow sealing gasket 32 prevents water and/or vapor from entering the inner cavity of the bottom case 2, ensuring safe operation.

Figure 7:
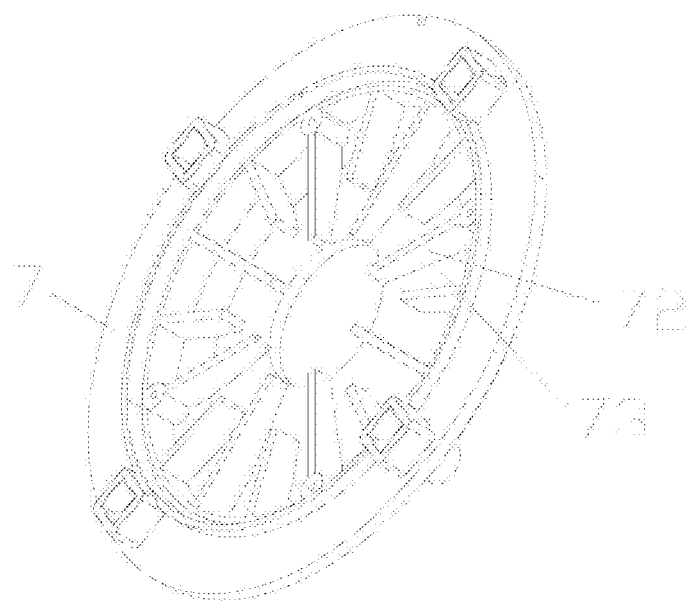
FIG. 7 shows a perspective view of the water guide bottom plate of the embodiment.

Referring to FIGS. 1 and 7 together, the water guide bottom plate 7 includes a second sealing ring 71. The second sealing ring 71 is located between the outer periphery of the water guide bottom plate 7 and the side wall of the bottom case 2. The bottom surface of the water guide bottom plate 7 has radial ribs 72 spaced at intervals, with water guide grooves 73 formed between the radial ribs 72.

Preferably, the filter cover 8 includes a third sealing ring 81. The third sealing ring 81 is located on a top face of the filter cover 8 and faces the water guide bottom plate 7.

Preferably, the showerhead 9 includes a water pressure regulator. The hose 91 is connected to both the showerhead 9 and the outlet port 22 by quick couplers 92 at both ends. The water pressure regulator makes it easier to adjust the water pressure at the showerhead 9 to suit the needs of different pets. The quick couplers 92 allow easy attachment of the showerhead 9 to the outlet port 22 on the bottom case 2 for easy operation.

Preferably, the showerhead 9 further includes a rubber comb-shaped massage head 93, which is located at the end face of the showerhead 9. The rubber comb-shaped massage head 93 can massage the pet's skin and fur directly while in the shower, thus eliminating manual finger rubbing and reducing the labor involved in bathing and grooming.

During pet showering operations, the pet is placed in a container such as a bathtub, with water containing shampoo filled to a minimum water level of approximately 3 cm. The self-circulating pet shower machine according to an embodiment is positioned on one side of the container. By connecting the motor power through the wire, the motor drives the impeller to rotate. The impeller draws water through the filter cover, water guide bottom plate, and booster plate into the bottom case. The pressurized water reaches the showerhead through the outlet port on the bottom case to provide a shower for bathing and grooming the pet. The dripping water falls back into the container, where it is sucked back into the self-circulating pet shower machine, repeating the process until the pet shower is complete.

In one embodiment, a first compartment is formed between the bottom case and the booster plate, while a second compartment is formed between the water guide bottom plate and the booster plate. The impeller is located in the second compartment and draws water from below the water guide bottom plate into the second compartment. Water from the second compartment passes through the booster plate into the first compartment, and finally sprays through the showerhead.

During this process, the filter cover effectively filters contaminants, such as fur, out of the container. The water guide bottom plate collects water in the inlet port through the water guide grooves formed between adjacent radial ribs. Water then enters the helical guide groove through the inlet holes on the periphery of the booster plate, increasing the water pressure.

The booster plate is designed with inlet holes arranged around its perimeter to not only increase water pressure, but also reduce the required immersion depth of the entire machine in the container. Therefore, merely maintain a water level of about 3 cm in the container is adequate to facilitate self-circulating pet shower. This circumvents the customary water discharge inherent in traditional pet grooming practices, leading to significant conservation of water resources, cost reduction in pet grooming, and enhanced grooming efficiency through the self-circulating flow of water.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

The terms and expressions used herein have the ordinary meaning accorded to such terms and expressions in their respective areas, except where specific meanings have been set forth. Relational terms such as "top" and "bottom" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

What is claimed is:

1. A self-circulating pet shower machine comprising:
   a top case comprising protrusions arranged at intervals in an inner cavity of and along a longitudinal direction of the top case;
   a bottom case connected with the top case by bolts and comprising a top face, a side wall connected to the top face, a first sealing ring, and an outlet port located on the side wall;
   a motor comprising an upper portion, a lower portion, a middle portion, and a stop, wherein the upper portion is located in the inner cavity of the top case, the middle portion is located between the upper portion and the lower portion, the stop is arranged along a periphery of the middle portion and capable of abutting against a bottom end of the protrusions, and the bottom case is capable of enclosing the lower portion and abutting against the stop, and wherein the first sealing ring is located between the top face of the bottom case and the stop;
   a shock-absorbing gasket between the stop and the bottom end of the protrusions;
   a booster plate located in an inner cavity of the bottom case and under both the outlet port and the motor, and comprising a plurality of inlet holes arranged on a periphery of the booster plate, wherein each of the inlet holes has a helical guide groove on a surface facing the motor;
   an impeller connected to a shaft of the motor that passes through the booster plate, and comprising a circular baffle, an inlet port, and an air passage, wherein the circular baffle is located at a central portion of the impeller, and the inlet port is surrounded by the circular baffle and connected with the air passage;
   a water guide bottom plate comprising an inner periphery and an outer periphery surrounding the inner periphery, wherein the inner periphery is embedded in the circular baffle of the impeller, and the outer periphery is secured to the side wall of the bottom case by the bolts;
   a filter cover located on a bottom face of the bottom case; and
   a showerhead connected to the outlet port by a hose.

2. The self-circulating pet shower machine of claim 1, wherein the top case further comprises a receiving groove and a wire clamp, wherein the receiving groove is located at an end face of the inner cavity of the top case and surrounds a wire hole, and the wire clamp is located and secured in the receiving groove by a securing plate near the end face of the top case, thereby allowing a wire to pass through the wire hole and the wire clamp for connection to the motor.

3. The self-circulating pet shower machine of claim 2, wherein the wire clamp comprises a rubber washer and three locking claws spaced on a surface of the rubber washer, wherein the three locking claws are inclined towards a center of the rubber washer, the securing plate has a through hole, and a diameter of the through hole is larger than an outer diameter of the wire and smaller than an inner diameter formed by the three locking claws.

4. The self-circulating pet shower machine of claim 1, wherein the top case further comprises a carrying handle disposed on an outer surface of the top case.

5. The self-circulating pet shower machine of claim 1, wherein the impeller comprises thin walls spaced at intervals and spiral air passages disposed between the thin walls.

6. The self-circulating pet shower machine of claim 1, wherein the motor further comprises an anti-backflow sealing gasket between the shaft of the motor and the bottom case.

7. The self-circulating pet shower machine of claim 1, wherein the water guide bottom plate comprises a second sealing ring between the outer periphery of the water guide bottom plate and the side wall of the bottom case, and wherein a bottom surface of the water guide bottom plate has radial ribs spaced at intervals, with water guide grooves formed between the radial ribs.

8. The self-circulating pet shower machine of claim 1, wherein the filter cover comprises a third sealing ring located on a top face of the filter cover and facing the water guide bottom plate.

9. The self-circulating pet shower machine of claim 1, wherein the showerhead comprises a water pressure regulator, and wherein the hose is connected to the showerhead and the outlet port by quick couplers at both ends.

10. The self-circulating pet shower machine of claim 1, wherein the showerhead further comprises a rubber comb-shaped massage head located at an end face of the showerhead.

\* \* \* \* \*